US011344987B2

(12) United States Patent
Feng et al.

(10) Patent No.: US 11,344,987 B2
(45) Date of Patent: May 31, 2022

(54) METHOD FOR MONITORING CHATTER IN MACHINING PROCESS

(71) Applicant: Tsinghua Shenzhen International Graduate School, Guangdong (CN)

(72) Inventors: Feng Feng, Guangdong (CN); Chao Xu, Guangdong (CN); Xueyu Mei, Guangdong (CN); Pingfa Feng, Guangdong (CN); Yuan Ma, Guangdong (CN)

(73) Assignee: Tsinghua Shenzhen International Graduate School, Guangdong (CN)

( * ) Notice: Subject to any disclaimer, the term of this patent is extended or adjusted under 35 U.S.C. 154(b) by 2 days.

(21) Appl. No.: 17/013,828

(22) Filed: Sep. 7, 2020

(65) Prior Publication Data

US 2021/0060720 A1 Mar. 4, 2021

Related U.S. Application Data

(63) Continuation of application No. PCT/CN2019/108453, filed on Sep. 27, 2019.

(30) Foreign Application Priority Data

Sep. 4, 2019 (CN) .......................... 201910832660.9

(51) Int. Cl.
*B23Q 17/12* (2006.01)
*G01H 1/00* (2006.01)

(52) U.S. Cl.
CPC .............. *B23Q 17/12* (2013.01); *G01H 1/00* (2013.01)

(58) Field of Classification Search
CPC .... B23Q 17/0971; B23Q 17/12; B23Q 17/00; G05B 19/4065; G05B 2219/37337;

(Continued)

(56) References Cited

U.S. PATENT DOCUMENTS 10,245,698 B2* 4/2019 Jeong ................... B23Q 17/098
2019/0250585 A1* 8/2019 Rich ................... G05B 19/4065

FOREIGN PATENT DOCUMENTS

CN 102284888 12/2011
CN 102284888 A * 12/2011

(Continued)

OTHER PUBLICATIONS

Vela-Marti'nez et al, Using detrended fluctuation analysis to monitor chattering in cutter tool machines, 2010, International Journal of Machine Tools & Manufacture 50(2010)651-657 (Year: 2010).*

(Continued)

*Primary Examiner* — Stephanie E Bloss
(74) *Attorney, Agent, or Firm* — Winston Hsu (57) ABSTRACT

A method for monitoring chatter in a machining process includes the following steps: collecting an original signal related to chatter in the machining process; for the original signal, obtaining a signal segment for calculation and analysis by updating data points in a sliding window with a set step-length, where the step-length refers to a number of data points updated every time in the sliding window, and is not greater than the size of the sliding window; calculating fractal dimensions of the signal segments in the sliding window by using a fractal algorithm; and comparing the calculated fractal dimension with an identification threshold to determine whether chatter occurs in the machining process. The measured signal does not need to be preprocessed by using the method, which can greatly improve calculation efficiency and can ensure accuracy of chatter identification.

14 Claims, 8 Drawing Sheets

(58) Field of Classification Search
CPC ........... G05B 2219/37351; G05B 2219/37434; G05B 2219/37435; G01H 1/00; G01H 17/00

See application file for complete search history.

(56) References Cited

FOREIGN PATENT DOCUMENTS

| | | | |
|---|---|---|---|
| CN | 103419090 | | 12/2013 |
| CN | 103419090 A | * | 12/2013 |
| CN | 103786069 | | 5/2014 |
| CN | 103786069 A | * | 5/2014 |
| CN | 107907327 A | * | 4/2018 |
| CN | 108544303 A | * | 9/2018 |
| CN | 106644481 B | * | 10/2018 |
| CN | 109514349 | | 3/2019 |
| CN | 109514349 A | * | 3/2019 |
| CN | 109991925 | | 7/2019 |
| CN | 109991925 A | * | 7/2019 |
| CN | 110561195 A | * | 12/2019 |
| JP | 2018054587 | | 4/2018 |
| JP | 2018054587 A | * 4/2018 ............ G01M 99/00 |
| WO | 9743729 | | 11/1997 |
| WO | WO-9743729 A1 | * 11/1997 ............ B23Q 17/12 |

OTHER PUBLICATIONS

Wu, "Vibration nonlinear characteristic test in the process of milling chatter", Dec. 2012.

Yongjian, "EEMD-based online milling chatter detection by fractal dimension and power spectral entropy", Mar. 9, 2017.

* cited by examiner

METHOD FOR MONITORING CHATTER IN MACHINING PROCESS

CROSS REFERENCE TO RELATED APPLICATIONS

This application is a continuation application of PCT/CN2019/108453filed on 2019-Sep.-27, which claims priority to CN patent application NO. 201910832660.9 filed on 2019-Sep.-4. The contents of the above-mentioned application are all hereby incorporated by reference.

BACKGROUND OF THE INVENTION

1. Field of the Invention

The present invention relates to an intelligent monitoring technology in the field of intelligent manufacturing, and in particular, to a method for monitoring chatter in machining process.

2. Description of the Prior Art

Machining methods include milling, turning, grinding, and the like. Chatter is spontaneous oscillation between a tool and a workpiece, which is a main factor affecting machining stability and quality of machined parts. Regenerative chatter is the most important chatter, whose mechanism is the phase difference between the wavy surfaces formed by the previous machining and the current one. The occurrence of chatter may reduce the machining precision of workpieces and cause fatigue damage to tools. Because of its sudden and serious damage in the machining process, online monitoring of chatter is of great significance to improve machining stability and quality.

Scholars worldwide have conducted many studies on chatter identification. The main steps include: signal decomposition, feature extraction, and chatter identification. A main function of signal decomposition is to decompose signals to obtain different signal components, merge key signal components related to chatter, and filter out signal components with weak chatter correlation to reduce the influence of noise on chatter identification, thereby improving the accuracy of chatter identification. The signal decomposition algorithms include: empirical mode decomposition method, wavelet decomposition method, variational mode decomposition, and the like. These decomposition algorithms are complicated in calculation and need to occupy a large amount of computing resources, which leads to identification lag and difficulty in implementing real-time online chatter monitoring. For example, in the research of Ji Y, et al. (The International Journal of Advanced Manufacturing Technology, 2017, 92: 1185), a fractal method for morphological covering was proposed, in which Empirical Mode Decomposition is first performed on the signal, and then the fractal dimension is calculated by using the fractal method for morphological covering. The author pointed out that the computational efficiency of the algorithm needs to be improved urgently. At present, in the reported studies, it is necessary to preprocess the signal, and there is no research on directly applying fractal dimension to signal calculation without preprocessing.

At present, chatter monitoring urgently needs a monitoring method with low computational complexity, which can implement the function of online chatter monitoring.

The above content disclosed in the background is only used to assist in understanding the concepts and technical solutions of the present invention, but does not necessarily belong to the prior art of this application. In the absence of clear evidence that the above content has been disclosed on the filing date of this application, the background should not be used to evaluate novelty and inventiveness of this application.

SUMMARY OF THE INVENTION

The main purpose of the present invention is to overcome the shortcomings of the existing related methods in computational complexity, and provide a method for monitoring chatter in the machining process, to improve the efficiency of chatter identification while ensuring the accuracy of chatter identification.

In order to achieve the above objective, the present invention adopts the following technical solutions.

A method for monitoring chatter in a machining process is provided. The method includes the following steps:

S1: collecting an original signal related to chatter in the machining process;

S2: for the original signal, obtaining a signal segment for calculation and analysis by updating data points in a sliding window with a set step-length, where the step-length refers to a number of data points updated every time in the sliding window, and is not greater than a size of the sliding window;

S3: calculating a fractal dimension of the signal segment in the sliding window by using a fractal algorithm; and S4: comparing the calculated fractal dimension to an identification threshold to determine whether chatter occurs in the machining process.

Further, the size of the sliding window is 100 to 10000 data points.

Further, the fractal algorithm is one algorithm or a combination of more algorithms, which include roughness scaling extraction algorithm, box counting algorithm, Katz algorithm, Higuchi algorithm, and KNN algorithm.

Further, in step S3, before the fractal dimension is calculated, a signal waveform of the signal segment is stretched or compressed in a horizontal direction and a vertical direction, stretching and compression coefficients being $\alpha$ and $\beta$, respectively, and coordinate values of the data points $(x_i, y_i)$ become $(\alpha \cdot x_i, \beta \cdot y_i)$ after stretching or compression, $i=1,2,3 \ldots N$, wherein difference between the variations in the horizontal direction and the vertical direction of the signal is within 1-1000 folds.

Further, the identification threshold is obtained from a preliminary test. The preliminary test includes: calculating fractal dimensions of a plurality of signal segments in the machining process by using steps S1 to S3, and identifying one or more of a stable state, a transition state, and a chatter state in the machining process by using a surface topography analysis method for a workpiece and a chatter signal feature analysis method; classifying the fractal dimensions of the signal segments according to the identified state, and determining the identification threshold by using one manner or a combination of more manners, which include histogram, probability distribution, and machine learning.

Further, the identification threshold is a value to distinguish between the stable state and the chatter state, or is a plurality of values to distinguish among the stable state, the transition state, and one or more chatter states of different degrees.

Further, the processing from step S2 to step S4 is performed by transmitting data to a single location in a lower computer, an upper computer, or in the cloud or distributing the data to two or more different locations.

Further, in step S2, the size of the sliding window is set to N data points, and the signal segment for fractal calculation is obtained by using the sliding window.

Further, in step S3, data points given in the sliding window are $p_i=(x_i, y_i)$, $i=1,2,3 \ldots N$, the signal waveform is stretched or compressed in the horizontal direction and the vertical direction, the stretching and compression coefficients being $\alpha$ and $\beta$, respectively, and then the fractal dimension of the signal in the sliding window is calculated according to the following steps:

(1) calculating a Euclidean distance between each point in the sliding window and a first point, and selecting a maximum distance as a plane range of the signal waveform:

$$d = \max(\sqrt{(\alpha \cdot x_i - \alpha \cdot x_1)^2 + (\beta \cdot y_i - \beta \cdot y_1)^2})$$

(2) calculating a total length L of the waveform formed by the data points in the sliding window:

$$L = \sum_{i=1}^{N-1} \left( \sqrt{(\alpha \cdot x_{i+1} - \alpha \cdot x_i)^2 + (\beta \cdot y_{i+1} - \beta \cdot y_i)^2} \right)$$

(3) for the N data points in the sliding window, calculating the fractal dimension FD of the signal in the sliding window, a number of intervals among the data points being n:

$$FD = \frac{\log(n)}{\log(n) + \log\left(\frac{d}{L}\right)}$$

(4) corresponding the calculated fractal dimension to the last data point in the sliding window, and in this way, except the first N−1 data points, each of the other data points has a corresponding fractal dimension.

Further, in step S3, data points given in the sliding window are $p_i=(x_i, y_i)$, $i=1,2,3 \ldots N$, the signal waveform is stretched or compressed in the horizontal direction and the vertical direction, the stretching and compression coefficients being $\alpha$ and $\beta$, respectively, and then the fractal dimension of the signal in the sliding window is calculated according to the following steps:

(1) dividing the signal into small signal segments with a same length, a number of data points in each of the small segments being k, and points of a same sequence number in each segment constituting a new set $y_k^m$ of data points:

$$y(m), y(m+k), y(m+2k), \ldots, y\left(m + \text{int}\left(\frac{N-1}{k}\right) \cdot k\right)$$

$$m = 1, 2, \ldots, k;$$

(2) calculating a length $L_m(k)$ of the waveform in the set $y_k^m$ of data points:

$$L_m(k) = \left( \frac{\sum_{i=1}^{N_s} |y(m+i \cdot k) - y(m+(i-1) \cdot k)|}{k} \right) \cdot K$$

$N_s$ is a number of valid signal segments;

$$N_s = \text{int}\left(\frac{N-1}{k}\right)$$

k is a normalization coefficient of the signal segment $y_k^m$;

$$K = \frac{N-1}{N_s \cdot k}$$

(3) calculating an average value L(k) of the lengths $L_m(k)$ of the waveform in different sets $y_k^m$ of data points:

$$L(k) = \frac{1}{k} \sum_{m=1}^{k} L_m(k)$$

(4) calculating the fractal dimension of the signal in the sliding window:

$$L(k) \sim k^{-FD}$$

The fractal dimension FD is equal to the slope of a relationship curve between $\ln(L(k))$ and $\ln(1/k)$, and obtained by using least squares fitting method.

Further, the process of determining the identification threshold includes the following steps:

obtaining fractal dimensions of test data points by using the method of step (1) to step (4);

except first N−1 data points, classifying the test data points according to a machining signal by using a signal analysis method, and dividing the test data points into a plurality of states, preferably into three states, comprising a stable state, a transition state, and a chatter state, each of the data points corresponding to a machining state;

corresponding the fractal dimension of each of the data points to a machining state to obtain a probability histogram; and determining a chatter threshold according to the probability histogram.

Further, the plurality of states include three states: a stable state, a transition state, and a chatter state.

Further, two identification thresholds for dividing the stable state, the transition state, and the chatter state are 1.5 and 1.95.

The present invention has the following beneficial effects.

The present invention discloses a method for monitoring chatter in machining process. The original signal related to chatter in the machining process such as milling, turning, grinding, or the like is acquired through the sensors. The data points are intercepted through the sliding window, and fractal dimensions of data segments in the sliding window are calculated through the fractal algorithm. The fractal dimensions are compared to chatter thresholds to determine whether chatter occurs in the machining system. According to the present invention, chatter phenomena in the machining process such as milling, turning, grinding and the like may be effectively identified with low computation complexity and high speed, which can greatly improve the real-time monitoring capability of the system, and has great significance for the implementation of online monitoring in industrial scenes. The measured signal does not need to be preprocessed by using the method of the present invention, which can greatly improve calculation efficiency and can ensure accuracy of chatter identification.

In comparison to the existing chatter monitoring methods, the chatter monitoring method of the present invention can achieve a high speed in calculation, and can effectively resolve the problem of response lag of the existing chatter monitoring methods. Through verification, the method can accurately identify the feature of chatter, and has an identification accuracy up to 98%, which meets the requirements for the chatter identification accuracy. In comparison to the chatter identification method based on empirical mode decomposition, the calculation speed of the method of the present invention is much higher by about 300 times, which fully meets the speed requirement of online monitoring.

Compared with the prior art, the invention significantly improves the calculation efficiency of the chatter identification method, and can be used for online monitoring of chatter in the machining process such as milling on an industrial site, which is of great significance for promoting the development of intelligent monitoring technologies in the machining process.

These and other objectives of the present invention will no doubt become obvious to those of ordinary skill in the art after reading the following detailed description of the preferred embodiment that is illustrated in the various figures and drawings.

DETAILED DESCRIPTION

The following describes implementations of the present invention in details. It should be emphasized that, the following descriptions are merely exemplary, and are not intended to limit the scope and the application of the present invention.

Figure 1:
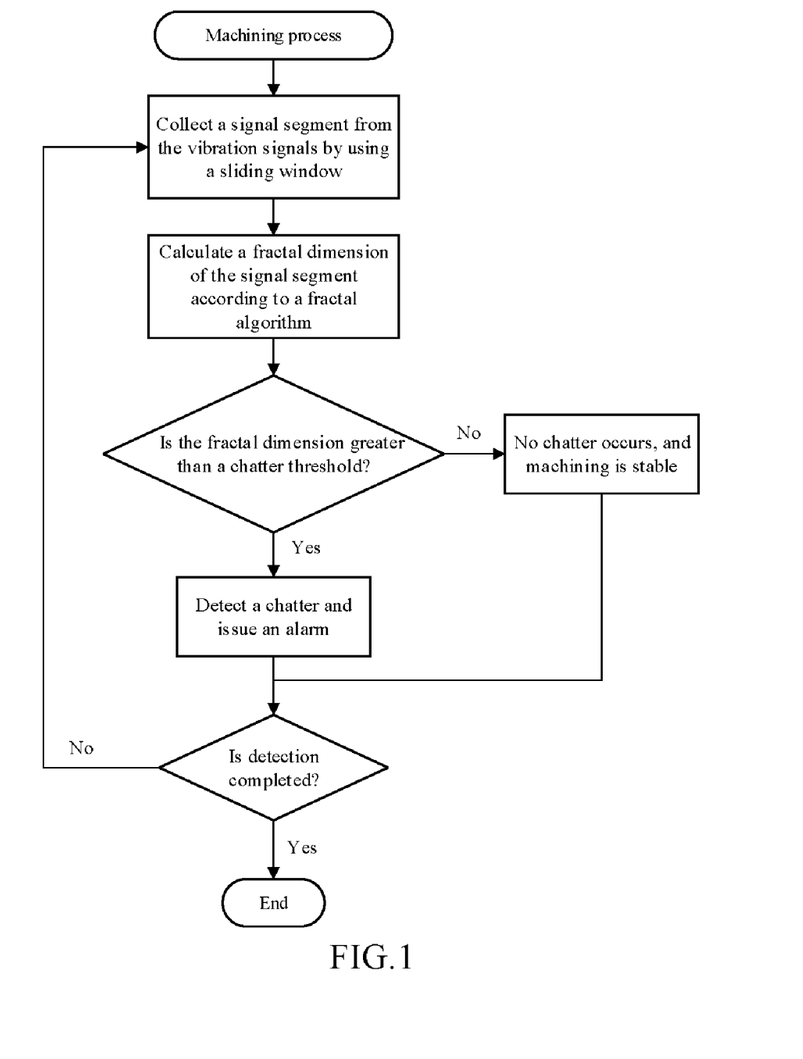
FIG. 1 is a flowchart of a method for monitoring chatter in a machining process according to an embodiment of the present invention.

Referring to FIG. 1, in an embodiment, a method for monitoring chatter in a machining process is provided, including the following steps.

Step 1: collecting a real-time original signal related to chatter in a machining process through a signal collection device.

The signal collection device may collect one or more signals such as vibration, cutting force, current, sound, and the like. A sensor may be placed at the cutting end of a machine tool spindle, on a machine table, at a position of machined work piece, and the like. Directions of the collected signals may be a single direction of X, Y, Z or a multi-directional combination. A sampling frequency of the signal collection process may be within a range of 100 Hz to 100,000 Hz.

Step 2: obtaining a signal segment for calculation and analysis by updating data points in a sliding window with a fixed size in real time by using a specific step-length.

A size (that is, the number of data points in the window) of the sliding window may be in the range of 100 to 10000. The step-length of window update to the number of data points updated in the window for each operation. The minimum value of the step-length is 1, and the maximum value is the size of the sliding window. Assuming that the size of the sliding window is 100 and the step-length is 1, when a new data point is collected, a data segment with a size of 100 is formed together with the previous 99 data points for fractal dimension calculation.

Step 3: no pre-processing such as signal decomposition is needed to be performed on the signal segment. A fractal dimension of the signal segment in the sliding window is calculated directly by using a fractal algorithm.

The fractal dimension of the collected signal is calculated directly by using the fractal algorithm. The fractal algorithm that may be used may be roughness scaling extraction algorithm, box counting algorithm, Katz algorithm, Higuchi algorithm, KNN algorithm, and the like, which is not limited to the listed fractal algorithms. In addition, a single algorithm may be used alone, or a combination of a plurality of fractal algorithms, or a combination of fractal algorithms and other methods may be used for chatter monitoring. A signal waveform may be stretched or compressed in a horizontal direction and a vertical direction, stretching and compression coefficients being $\alpha$ and $\beta$, respectively, and coordinate values of the data points $(x_i, y_i)$, $i=1,2,3 \ldots N$ become $(\alpha \cdot x_i, \beta \cdot y_i)$ after the stretching or compression. The difference between the variations in the horizontal direction and the vertical direction of the signal is within 1-1000 folds . . . . The stretching or compression coefficient may be 1, that is, stretching and compression are not necessary.

Step 4: comparing the calculated fractal dimension with an identification threshold to determine whether chatter occurs in the machining process; and if yes, issue an alarm signal.

The identification threshold may be determined through preliminary tests. In the preliminary tests, when the fractal dimensions are calculated by using step 1 to step 3, a stable state, a transition state, and a chatter state in the machining process are determined by using a surface topography analysis method of a work piece, a conventional chatter signal analysis method, and the like. The fractal dimensions of the signal segments are classified according to the machining state, and a chatter threshold is obtained by using a combination of one or more manners of a histogram, a probability distribution, a classifier, and the like. The identification threshold may be a value to distinguish between the stable state and the chatter state, or may be a plurality of values to distinguish among the stable state, the transition state, a slight chatter state, a severe chatter state, and the like.

Step 5: determining whether all the signals are analyzed, if yes, end chatter identification; if not, continue to collect a signal segment and analyze a machining condition.

In the method of the invention, steps 2 to 5 may be calculated by using a lower computer, an upper computer, or on the cloud. The operation mode of the lower computer means that the sensor data is sent to the single-chip microcomputer, and the single-chip microcomputer performs fractal calculation to determine whether chatter occurs, sends the data to the upper computer in a wireless or wired manner for response, or issues an alarm by itself. The operation mode of the upper computer means that the sensor data is sent to the upper computer in a wired manner such as a signal collection card or by using a wireless sensor network (in a manner of WiFi, Zigbee, Bluetooth, and the like), and then fractal calculation is performed to determine whether chatter occurs and make response. The operation mode of cloud computing refers to sending data to the cloud, and then performing fractal calculation to determine whether chatter occurs and make response. It should be noted that all operations of the present method are not limited to one place of the lower computer, the upper computer or the cloud, and the operations maybe distributed to different places.

The following further describes the specific embodiments of the present invention with reference to the accompanying drawings.

Embodiment 1

Figure 2:
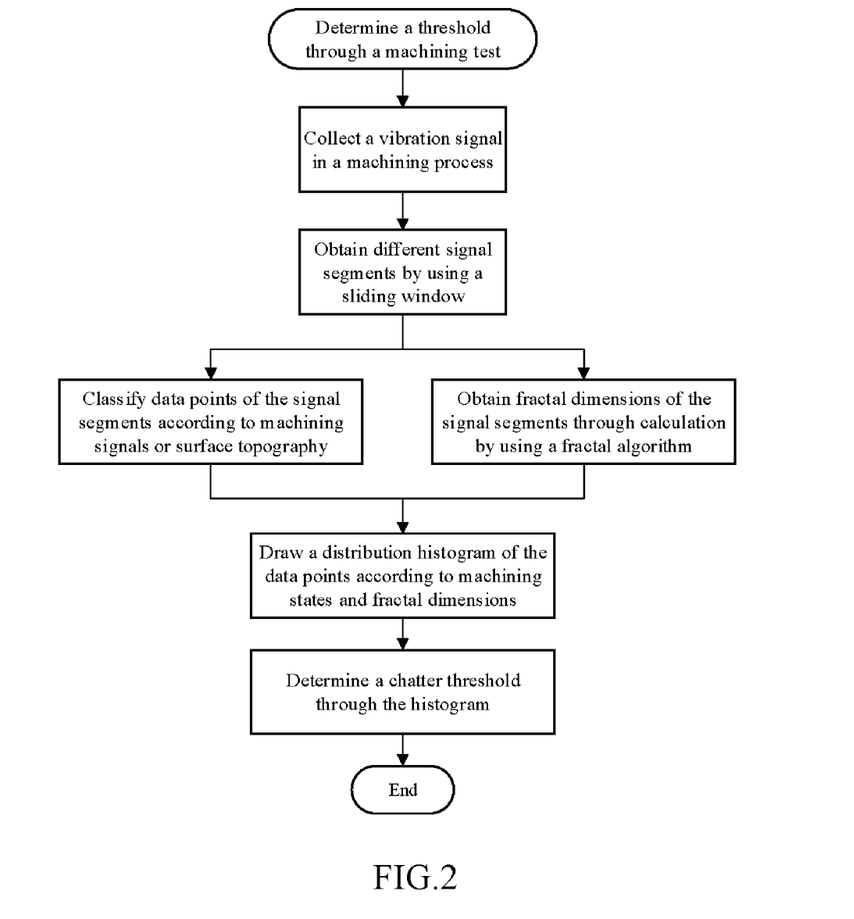
FIG. 2 is a flowchart of a threshold determining method according to an embodiment of the present invention.

A threshold of the fractal dimension is an important criterion for determining whether chatter occurs. In this embodiment, a case of determining the threshold by using a histogram is described. With reference to FIG. 2, an implementation of determining the threshold in the present invention is described in details below, including the following steps.

Figure 3:
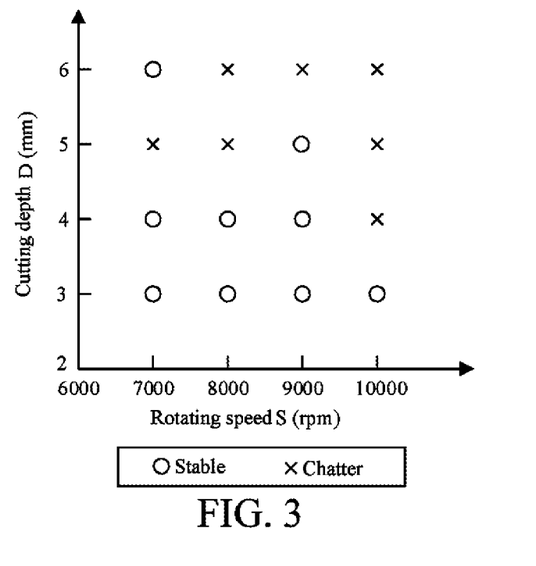
FIG. 3 is a schematic diagram of the states of a test signal during milling.

Step 1: performing a cutting test, and place a vibration sensor on an end of a machine tool spindle. A signal collection device sends the collected vibration signal to a computer. The cutting speeds are 7000 rpm, 8000 rpm, 9000 rpm, and 10,000 rpm. The cutting depths are 3 mm, 4 mm, 5 mm, and 6 mm. An aluminium plate of 100 mm×100 mm is cut, and a total of 16 sets of experimental data are obtained. Chatter occurs in 7 sets, as specifically shown in FIG. 3.

Figure 4:
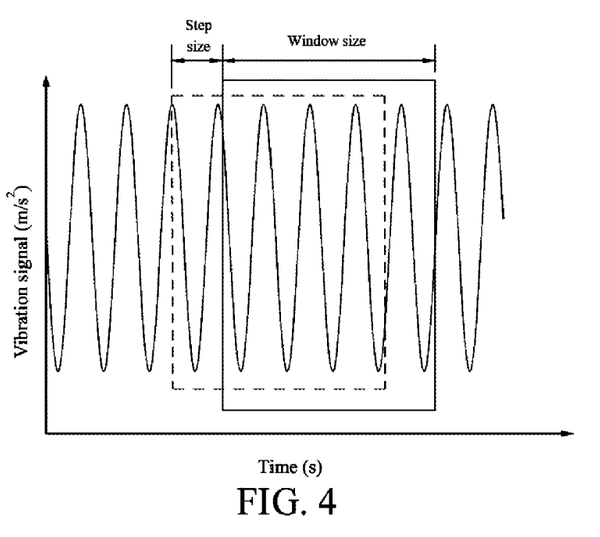
FIG. 4 is a schematic diagram of a sliding window model according to an embodiment of the present invention.

Step 2: a sliding window model is shown in FIG. 4, with a fixed window size of 800 data points and a step-length of 1 to obtain a fixed-length signal segment for fractal calculation.

Step 3: calculating a fractal dimension of the signal in the sliding window by using a fractal algorithm. Data points given in the sliding window are $p_i=(x_i, y_i)$, $i=1,2,3 \ldots N$, the signal waveform may be stretched or compressed in a horizontal direction and a vertical direction, the stretching and compression coefficients being $\alpha$ and $\beta$, respectively, and then the fractal dimension of the signal in the sliding window is calculated by using the following fractal algorithm, which is performed according to the following steps.

(1) calculating a Euclidean distance between each point in a window and a first point, and select a maximum distance as a plane range of the signal waveform:

$$d=\max(\sqrt{(\alpha \cdot x_i - \alpha \cdot x_1)^2 + (\beta \cdot y_i - \beta \cdot y_1)^2})$$

(2) calculating a total length L of the waveform formed by the data points in the window:

$$L=\sum_{i=1}^{N-1} \left( \sqrt{(\alpha \cdot x_{i+1} - \alpha \cdot x_i)^2 + (\beta \cdot y_{i+1} - \beta \cdot y_i)^2} \right)$$

(3) For 800 data points in the sliding window, calculating the fractal dimension FD of the signal in the window, a number of intervals among the data points being n=799:

$$FD = \frac{\log(n)}{\log(n) + \log\left(\frac{d}{L}\right)}$$

Step 4: corresponding the fractal dimension to the last data point in the window upon completion of calculation of the fractal dimensions of all the windows. Except the first 799 data points, each of the data points has a corresponding fractal dimension.

Figure 5:
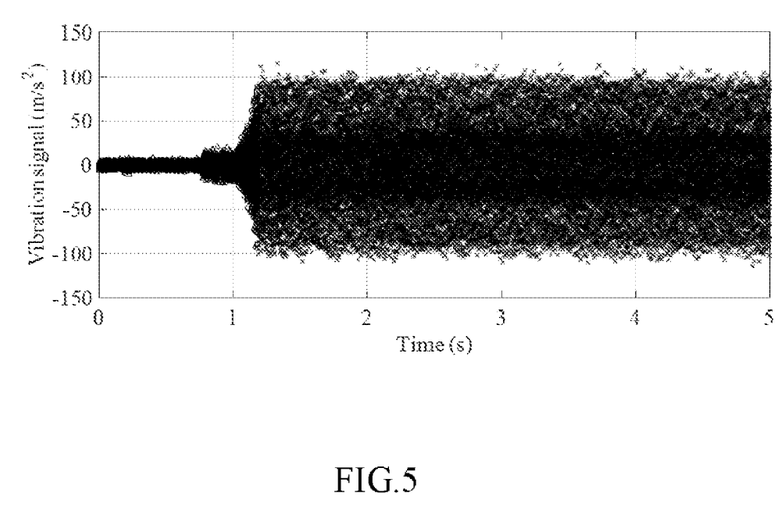
FIG. 5 is a schematic diagram of vibration signal data point classification according to an embodiment of the present invention.

Step 5: classifying the data points into three states (a stable state, a transition state, and a chatter state) according to a machining signal by using a conventional signal analysis method. Each of the data points corresponds to a machining state, as shown in FIG. 5.

Figure 6:
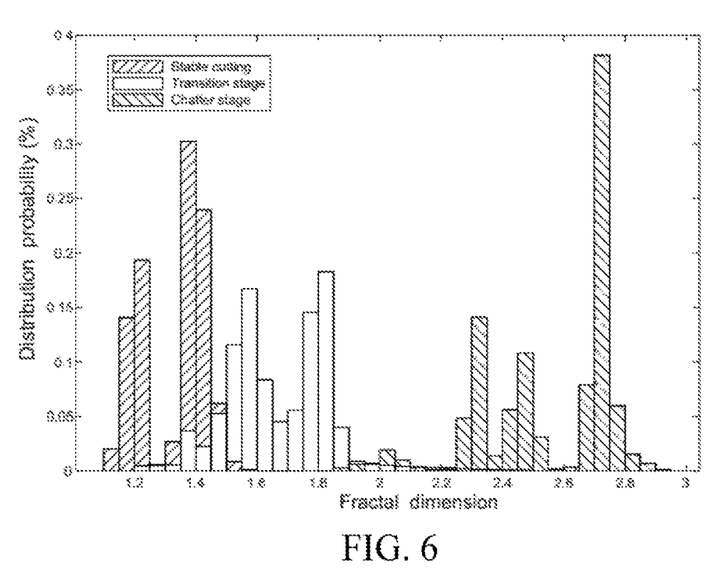
FIG. 6 is a histogram of probability distribution of cutting states and fractal dimensions of the data points according to an embodiment of the present invention.

Step 6: corresponding the fractal dimension of each of the points to a machining state to obtain a probability histogram, as shown in FIG. 6.

Step 7: determining a chatter threshold according to the probability histogram. When the fractal dimension is lower than 1.5, the stable state is dominant; when the fractal dimension is 1.5-1.95, the transition state is dominant; and when the fractal dimension is larger than 1.95, the chatter state is dominant. Therefore, the thresholds may be set as 1.5 and 1.95. For different machining methods, signal types, and machining tools, the setting of threshold is determined according to specific conditions.

Embodiment 2

A method for monitoring chatter online in a machining process is provided. An implementation process is shown in FIG. 1, including the following steps.

Step 1: collecting original vibration signals in directions X, Y, and Z during milling by using a machine tool, a vibration sensor and a data collection card. Generally, when the machine tool chatters, the energy is mainly concentrated between 3000 Hz and 5000 Hz, so that a sampling frequency f is greater than 9600 Hz.

Step 2: in a sliding window model shown in FIG. 4, select N=800 as the size of the sliding window according to the sampling frequency. If a step-length of the sliding window is one data point, the fractal dimension of the signal is calculated when a new data point is collected.

Figure 7:
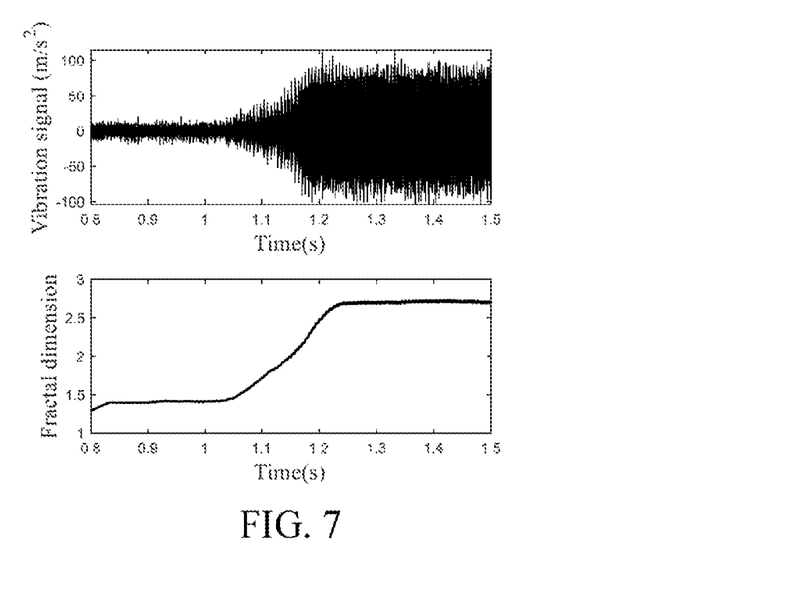
FIG. 7 is a schematic diagram showing changes of fractal dimensions of signals during chatter according to an embodiment of the present invention.

Step 3: data points given in the sliding window are $p_i=(x_i, y_i)$, $i=1,2,3 \ldots N$, the signal waveform may be stretched or compressed in a horizontal direction and a vertical direction, the stretching and compression coefficients being $\alpha$ and $\beta$, respectively, and then the fractal dimensions of the signal in the sliding window are calculated by using the fractal algorithm, as shown in FIG. 7.

Step 4: comparing the fractal dimension to the set threshold γ. The fractal dimension is an indicator representing the complexity of the signal, and a larger fractal dimension indicates a higher complexity of the signal.

a) When the fractal dimension of the signal is greater than or equal to γ, it indicates that the signal complexity is high, and chatter occurs in the machining process, thus an alarm needs to be issued.

b) When the fractal dimension of the signal is lower than γ, it indicates that the signal is relatively stable, and has low complexity, thus there is a stable state.

Step 5: determining whether the signal is completely analyzed, and if not, continue to use the sliding window to collect new data segments for analysis; and if yes, end the entire process.

Embodiment 3

A method for monitoring chatter online in a machining process is provided. Based on analysis for fractal signal of time series, an implementation process is shown in FIG. 1, including the following steps.

Step 1: collecting original vibration signals in directions X, Y, and Z during milling of a machine tool by using a vibration sensor and a data collection card. Generally, when the machine tool chatters, the energy is mainly concentrated between 3000 Hz and 6000 Hz, so that a sampling frequency f is greater than 9600 Hz.

Step 2: in a sliding window model shown in FIG. 4, selecting N=800 as the size of the sliding window according to the sampling frequency. If a step-length of the sliding window is one data point, the fractal dimension of the signal is calculated when a new data point is collected.

Step 3: setting the coordinate value of the data point as $p_i=(x_i, y_i)$, i=1,2,3 ... N after the given data point in the sliding window is stretched and compressed. Then calculate the fractal dimension of the signal in the window. The calculation of the fractal dimension is performed according to the following steps.

(1) dividing the signal into small signal segments with the same length, a number of data points in each of the small segments being k, k ranging from 1 to 50, the data points with the same sequence number in each segment constituting a new set $y_k^m$ of data points, and $y_k^m$ being defined below:

$$y_k^m : y(m), y(m+k), y(m+2k), \ldots, y\left(m + \text{int}\left(\frac{N-1}{N}\right) \cdot k\right)$$

$$m = 1, 2, \ldots, k.$$

(2) calculating a length $L_m(k)$ of the waveform in the set $y_k^m$ of data points, which is defined below:

$$L_m(k) = \left(\frac{\sum_{i=1}^{N_s} |y(m+i \cdot k) - y(m+(i-1) \cdot k)|}{k}\right) \cdot K$$

$N_s$ is a number of valid signal segments and defined below:

$$N_s = \text{int}\left(\frac{N-1}{k}\right)$$

k is a normalization coefficient of the signal segment $y_k^m$ and defined below:

$$K = \frac{N-1}{N_s \cdot k}$$

(3) calculating a length $L_m(k)$ of the waveform in the set $y_k^m$ of different data points, with an average value of $L_m(k)$:

$$L(k) = \frac{1}{k} \sum_{m=1}^{k} L_m(k)$$

(4) calculating the fractal dimension of the signal in the window by using the following equation:

$$L(k) \sim k^{-FD}$$

Figure 8:
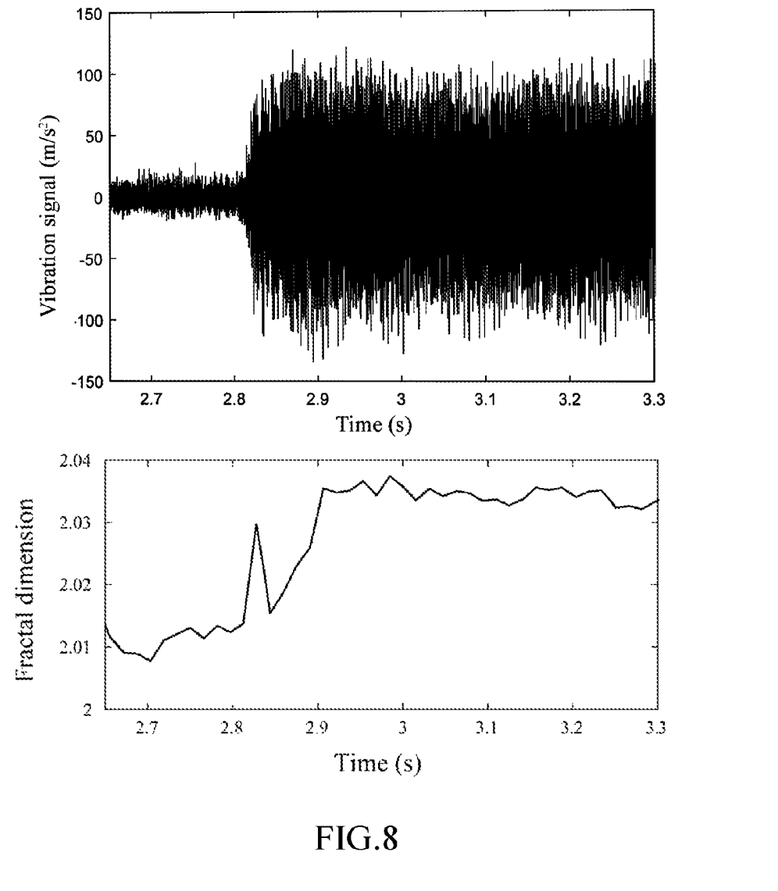
FIG. 8 is a schematic diagram showing changes of fractal dimensions of signals during chatter according to another embodiment of the present invention.

That is, the fractal dimension FD is equal to the slope of the relationship curve between ln(L(k)) and ln(1/k), and obtained by using the least squares fitting method. The result is shown in FIG. 8.

Step 4: comparing the fractal dimension to the threshold γ, the fractal dimension being an indicator representing the complexity of the signal, and a larger fractal dimension indicates a higher complexity of the signal.

a) When the fractal dimension of the signal is greater than or equal to γ, it indicates that the signal complexity is high, and chatter occurs in the machining process, thus an alarm needs to be issued.

b) When the fractal dimension of the signal is lower than γ, it indicates that the signal is relatively stable, and has low complexity, thus there is a stable state.

Step 5: determining whether the signal is completely analyzed, and if not, continue to use the sliding window to collect new data segments for analysis; and if yes, end the entire process.

The foregoing content further describes the present invention in detail with reference to specific exemplary embodiments, and the specification should not be construed as a limitation on the specific embodiments of the present invention. A person of ordinary skill in the art, to which the present invention belong, may make various replacements or variations without departing from the concept of the present invention, and theses replacements or variations shall belong to the protection scope of the present invention. In the descriptions of this specification, descriptions such as reference terms "an embodiment", "some embodiments", "preferred embodiment", "example", "specific example", or "some examples" intend to indicate that specific features, structures, materials, or characteristics described with reference to embodiments or examples are included in at least one embodiment or example of the present invention. In this specification, schematic descriptions of the foregoing terms do not necessarily directed at a same embodiment or example. Moreover, the specific features, structures, materials, or characteristics described may be combined in any one or more embodiments or examples in an appropriate manner. In addition, in a case that is not mutually contradictory, a person skilled in the art can combine or group different embodiments or examples that are described in this specification and features of the different embodiments or examples. Although the embodiments and advantages of the present invention have been described in detail, it should be understood that, various variations, replacements and modifications may be made in this specification without departing from the scope limited by the appended claims. In addition, the scope of the present invention is not limited to a process, machine, manufacturing, material composition, manner, method, and step in a specific embodiment described in this specification. A person of ordinary skill in the art easily understand that, the existing or to-be-developed process, machine, manufacturing, material composition, manner, method, and step from the content of the disclosure, which performs the substantially same function of the corresponding embodiments of this specification or obtains the substantially same result of the embodiments of this specification, may be used. Therefore, the scope of the appended claims includes the foregoing process, machine, manufacturing, material composition, manner, method, and step.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for monitoring chatter in a machining process, comprising the following steps:
    S1: collecting an original signal related to chatter in the machining process;
    S2: for the original signal, obtaining a signal segment for calculation and analysis by updating data points in a sliding window with a set step-length, wherein the step-length refers to a number of data points updated every time in the sliding window, and is not greater than a size of the sliding window;
    S3: calculating a fractal dimension of the signal segments in the sliding window by using a fractal algorithm; and
    S4: comparing the calculated fractal dimension with an identification threshold, determining that chatter occurs in the machining process when the fractal dimension is greater than or equal to the identification threshold, and determining there is a stable state in the machining process when the fractal dimension is lower than the identification threshold.

2. The monitoring method according to claim 1, wherein the size of the sliding window is 100 to 10000 data points.

3. The monitoring method according to claim 1, wherein the fractal algorithm is one algorithm or a combination of more algorithms, which include roughness scaling extraction algorithm, box counting algorithm, Katz algorithm, Higuchi algorithm, and KNN algorithm.

4. The monitoring method according to claim 1, wherein in step S3, before the fractal dimension is calculated, a signal waveform of the signal segment is stretched or compressed in a horizontal direction and a vertical direction, stretching and compression coefficients being α and β, respectively, and coordinate values of the data points $(x_i, y_i)$ become $(\alpha \cdot x_i, \beta \cdot y_i)$ after stretching or compression, i=1,2,3 . . . N, wherein difference between the variations in the horizontal direction and the vertical direction of the signal is within 1-1000 folds.

5. The monitoring method according to claim 1, wherein the identification threshold is obtained from a preliminary test, the preliminary test comprising: calculating fractal dimensions of a plurality of signal segments in the machining process by using steps S1 to S3, and identifying one or more of a stable state, a transition state, and a chatter state in the machining process by using a surface topography analysis method for a workpiece and a chatter signal feature analysis method; classifying the fractal dimensions of the signal segments according to the identified state, and determining the identification threshold by using one manner or a combination of more manners, which include histogram, probability distribution, and machine learning.

6. The monitoring method according to claim 5, wherein the identification threshold is a value to distinguish between the stable state and the chatter state, or is a plurality of values to distinguish among the stable state, the transition state, and the chatter state.

7. The monitoring method according to claim 1, wherein
    in step S2, the size of the sliding window is N data points, and the signal segment for fractal calculation is obtained by using the sliding window;
    in step S3, data points given in the sliding window are $p_i=(x_i, y_i)$, i=1,2,3 . . . N, the signal waveform is stretched or compressed in the horizontal direction and the vertical direction, the stretching and compression coefficients being α and β, respectively, and then the fractal dimension of the signal in the sliding window is calculated according to the following steps:
    (1) calculating a Euclidean distance between each point in the sliding window and a first point, and selecting a maximum distance as a plane range of the signal waveform:

$$d = \max(\sqrt{(\alpha \cdot x_i - \alpha \cdot x_1)^2 + (\beta \cdot y_i - \beta \cdot y_1)^2})$$

(2) calculating a total length L of the signal waveform formed by the data points in the sliding window:

$$L = \sum_{i=1}^{N-1} \left( \sqrt{(\alpha \cdot x_{i+1} - \alpha \cdot x_i)^2 + (\beta \cdot y_{i+1} - \beta \cdot y_i)^2} \right)$$

(3) for the N data points in the sliding window, calculating the fractal dimension FD of the signal in the sliding window, a number of intervals among the data points being n:

$$FD = \frac{\log(n)}{\log(n) + \log\left(\frac{d}{L}\right)}$$

(4) corresponding the calculated fractal dimension to a last data point in the sliding window, and in this way, except first N−1 data points, each of other data points has a corresponding fractal dimension.

8. The monitoring method according to claim 7, wherein the process of determining the identification threshold comprises the following steps:
    obtaining fractal dimensions of test data points by using the method of step (1) to step (4);
    except the first N−1 data points, classifying the test data points according to a machining signal by using a signal analysis method, and dividing the test data points into a plurality of states, each of the data points corresponding to a machining state;
    corresponding the fractal dimension of each of the data points to a machining state to obtain a probability histogram; and
    determining a chatter threshold according to the probability histogram.

9. The monitoring method according to claim 8, wherein the plurality of states comprise three states: a stable state, a transition state, and a chatter state.

10. The monitoring method according to claim 9, wherein two identification thresholds for dividing the three states are 1.5 and 1.95.

11. The monitoring method according to claim 1, wherein in step S2, the size of the sliding window is N data points, and the signal segment for fractal calculation is obtained by using the sliding window;

in step S3, data points given in the sliding window are $p_i=(x_i, y_i)$, i=1,2,3 . . . N, the signal waveform is stretched or compressed in the horizontal direction and the vertical direction, the stretching and compression coefficients being $\alpha$ and $\beta$, respectively, and then the fractal dimension of the signal in the sliding window is calculated according to the following steps:

(1) dividing the signal into small signal segments with a same length, a number of data points in each of the small segments being k, and points of a same sequence number in each segment constituting a new set $y_k^m$ of data points:

$$y(m), y(m+k), y(m+2k), \ldots, y\left(m + \text{int}\left(\frac{N-1}{N}\right) \cdot k\right)$$

$$m = 1, 2, \ldots, k;$$

(2) calculating a length $L_m(k)$ of the waveform in the set $y_k^m$ of data points:

$$L_m(k) = \left(\frac{\sum_{i=1}^{N_s} |y(m+i \cdot k) - y(m+(i-1) \cdot k)|}{k}\right) \cdot K$$

$N_s$ is a number of valid signal segments;

$$N_s = \text{int}\left(\frac{N-1}{k}\right)$$

k is a normalization coefficient of the signal segment $y_k^m$;

$$K = \frac{N-1}{N_s \cdot k}$$

(3) calculating an average value L(k) of the lengths $L_m(k)$ of the waveform in different sets $y_k^m$ of data points:

$$L(k) = \frac{1}{k}\sum_{m=1}^{k} L_m(k)$$

(4) calculating the fractal dimension of the signal in the sliding window:

$$L(k) \sim k^{-FD}$$

the fractal dimension FD is equal to the slope of a relationship curve between $\ln(L(k))$ and $\ln(1/k)$, and obtained by using least squares fitting method.

12. The monitoring method according to claim 11, wherein the process of determining the identification threshold comprises the following steps:

obtaining fractal dimensions of test data points by using the method of step (1) to step (4);

except first N−1 data points, classifying the test data points according to a machining signal by using a signal analysis method, and dividing the test data points into a plurality of states, each of the data points corresponding to a machining state;

corresponding the fractal dimension of each of the data points to a machining state to obtain a probability histogram; and determining a chatter threshold according to the probability histogram.

13. The monitoring method according to claim 12, wherein the plurality of states comprise three states: a stable state, a transition state, and a chatter state.

14. The monitoring method according to claim 13, wherein two identification thresholds for dividing the three states (the stable state, the transition state, and the chatter state) are 1.5 and 1.95.

* * * * *